US012230853B2

(12) United States Patent
Asai

(10) Patent No.: US 12,230,853 B2
(45) Date of Patent: Feb. 18, 2025

(54) BAND-PASS FILTER INCLUDING PLURAL RESONATORS HAVING A CONDUCTIVE PIN STRUCTURE ASSOCIATED THEREWITH

(71) Applicant: KYOCERA Corporation, Kyoto (JP)

(72) Inventor: Satoshi Asai, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 316 days.

(21) Appl. No.: 17/780,226

(22) PCT Filed: Nov. 19, 2020

(86) PCT No.: PCT/JP2020/043124
§ 371 (c)(1),
(2) Date: May 26, 2022

(87) PCT Pub. No.: WO2021/106731
PCT Pub. Date: Jun. 3, 2021

(65) Prior Publication Data

US 2022/0416388 A1 Dec. 29, 2022

(30) Foreign Application Priority Data

Nov. 27, 2019 (JP) ................................ 2019-214077

(51) Int. Cl.
*H01P 1/208* (2006.01)
*H01P 3/127* (2006.01)
*H01P 7/06* (2006.01)

(52) U.S. Cl.
CPC .......... *H01P 1/2088* (2013.01); *H01P 1/2084* (2013.01); *H01P 3/127* (2013.01); *H01P 7/065* (2013.01)

(58) Field of Classification Search
CPC ......... H01P 1/2088; H01P 7/065; H01P 5/103
USPC .......................................................... 333/208
See application file for complete search history.

(56) References Cited

U.S. PATENT DOCUMENTS 6,160,463 A * 12/2000 Arakawa et al. ..... H01P 1/2088 333/219.1

FOREIGN PATENT DOCUMENTS

JP 10-093311 A 4/1998
JP 10-303618 A 11/1998
JP 2007-288253 A 11/2007
WO 2018/139321 A1 8/2018

* cited by examiner

*Primary Examiner* — Benny T Lee
(74) *Attorney, Agent, or Firm* — Volpe Koenig

(57) ABSTRACT

Provided is a band-pass filter that includes a plurality of resonators that are electromagnetically coupled to each other. At least one of the plurality of resonators is a specific resonator to which a signal is input from outside or that outputs a signal to the outside. The specific resonator includes a conductor pin, a first surrounding conductor that surrounds the conductor pin in a radial direction, a dielectric that is positioned between the conductor pin and the surrounding conductor, a second surrounding conductor that surrounds the dielectric in an axial direction of the conductor pin, and an intermediate conductor that extends in a direction crossing the axial direction of the conductor pin and that electrically connects the conductor pin to the first surrounding conductor or the second surrounding conductor.

18 Claims, 9 Drawing Sheets

BAND-PASS FILTER INCLUDING PLURAL RESONATORS HAVING A CONDUCTIVE PIN STRUCTURE ASSOCIATED THEREWITH

TECHNICAL FIELD

The present invention relates to a band-pass filter.

BACKGROUND

There is known a band-pass filter that is formed by combining a plurality of dielectric resonators has been known for some time. (see, for example, Japanese Unexamined Patent Application Publication No. 10-303618 published on Nov. 13, 1998).

SUMMARY

In the case where a reduction in the size of a band-pass filter formed by combining a plurality of dielectric resonators is facilitated so as to set the pass frequency band to be a high frequency, it may sometimes become difficult to perform an adjustment of impedance.

A band-pass filter according to the present disclosure is a band-pass filter including a plurality of resonators that are electromagnetically coupled to each other. At least one of the plurality of resonators is a specific resonator to which a signal is input from outside the band-pass filter or that outputs a signal to the outside. The specific resonator includes a conductor pin, a first surrounding conductor that surrounds the conductor pin in a radial direction, a dielectric that is positioned between the conductor pin and the first surrounding conductor, a second surrounding conductor that surrounds the dielectric in an axial direction of the conductor pin, and an intermediate conductor that extends in a direction crossing the axial direction and that electrically connects the conductor pin to the first surrounding conductor or the second surrounding conductor.

DETAILED DESCRIPTION OF THE EMBODIMENTS

Embodiments of the present disclosure will be described in detail below with reference to the drawings, where like features are denoted by the same reference labels throughout the detailed description of the drawings. Unless noted otherwise, features with the same name, but with different letters ending their reference number, have the same features. For example, "first resonator 10", "first resonator 10A", "first resonator 10B", and "first resonator 10D" share the same characteristics unless an alternate description is provided.

First Embodiment

Figure 1:
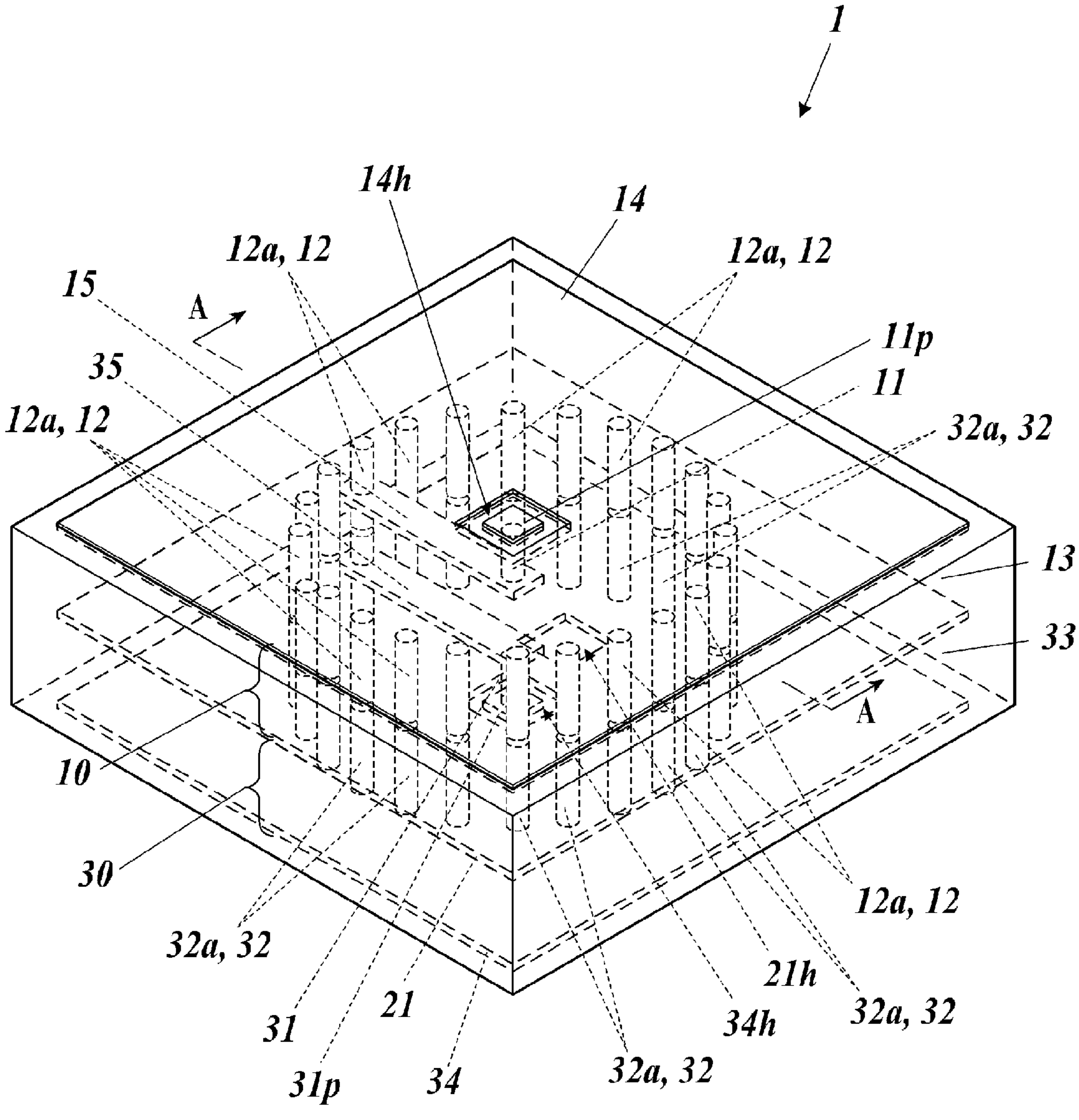
FIG. 1 is a perspective view illustrating a band-pass filter of a first embodiment of the present disclosure.
Figure 2:
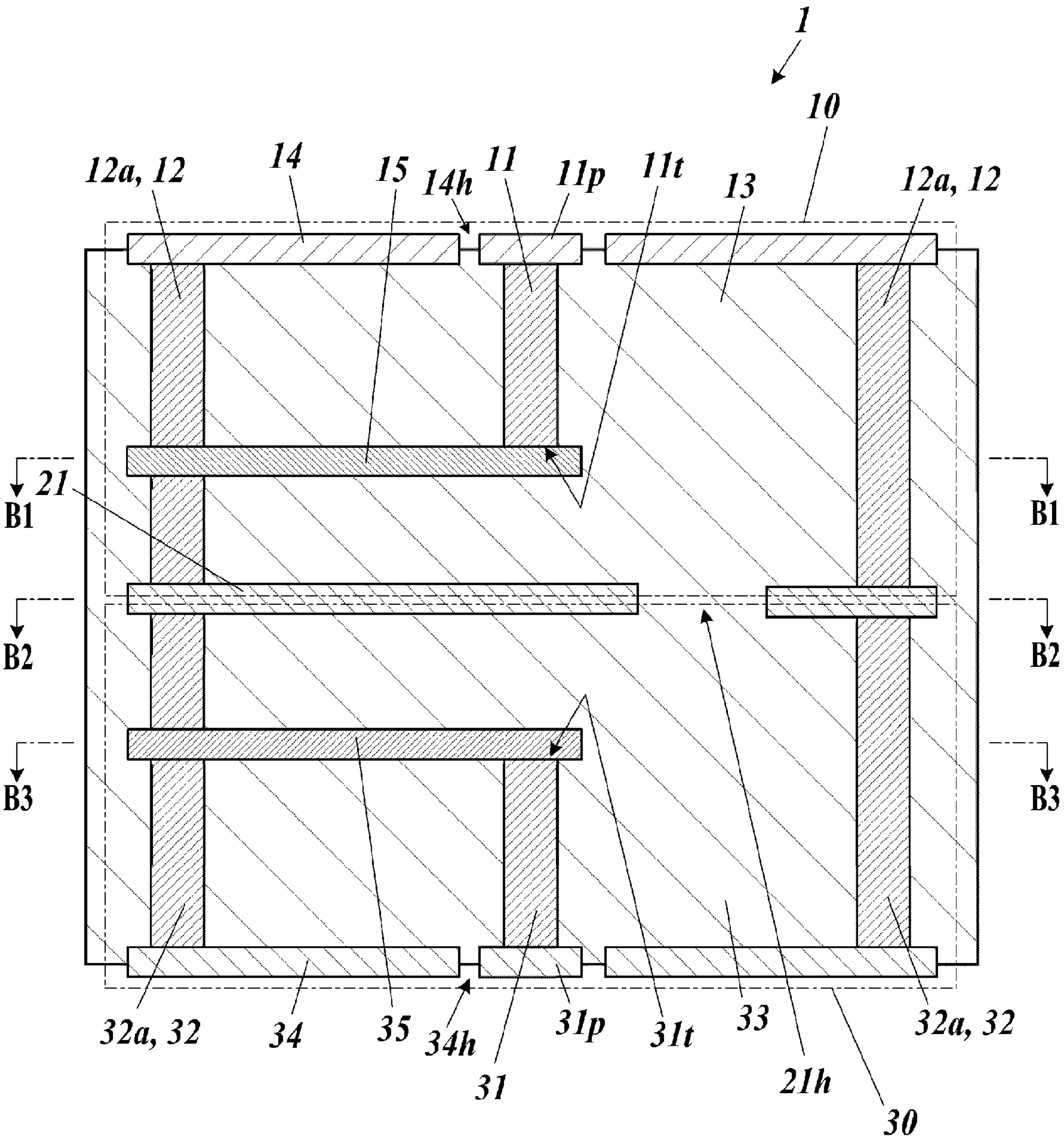
FIG. 2 is a longitudinal sectional view taken along line A-A of FIG. 1.
Figure 3A:
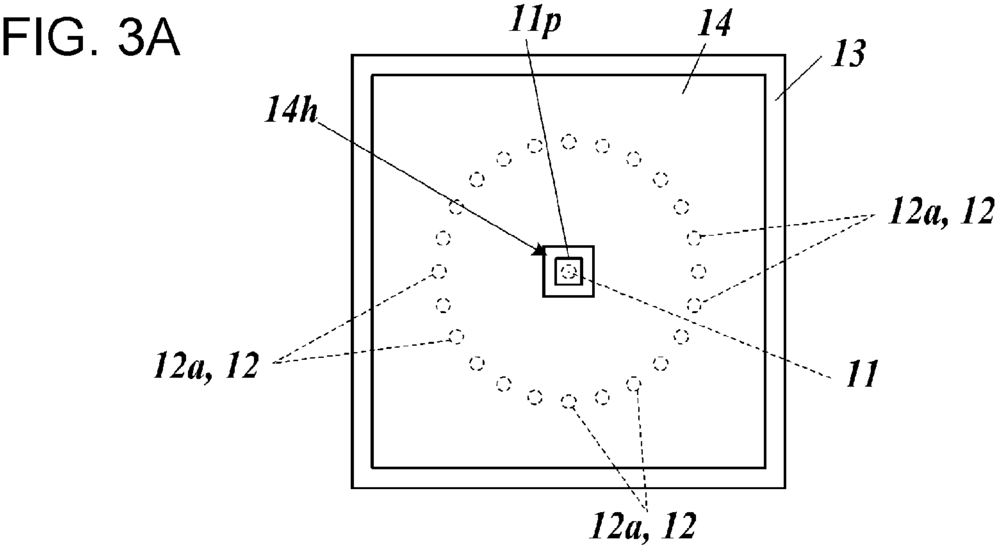
FIG. 3A is a plan view illustrating the band-pass filter of the first embodiment.
Figure 3B:
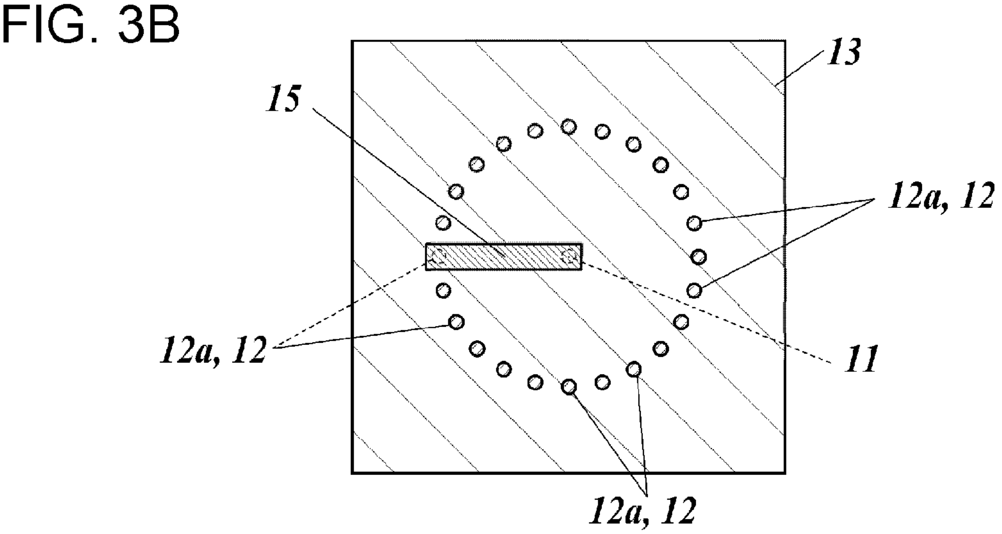
FIG. 3B is a sectional view taken along line B1-B1 of FIG. 2.
Figure 3C:
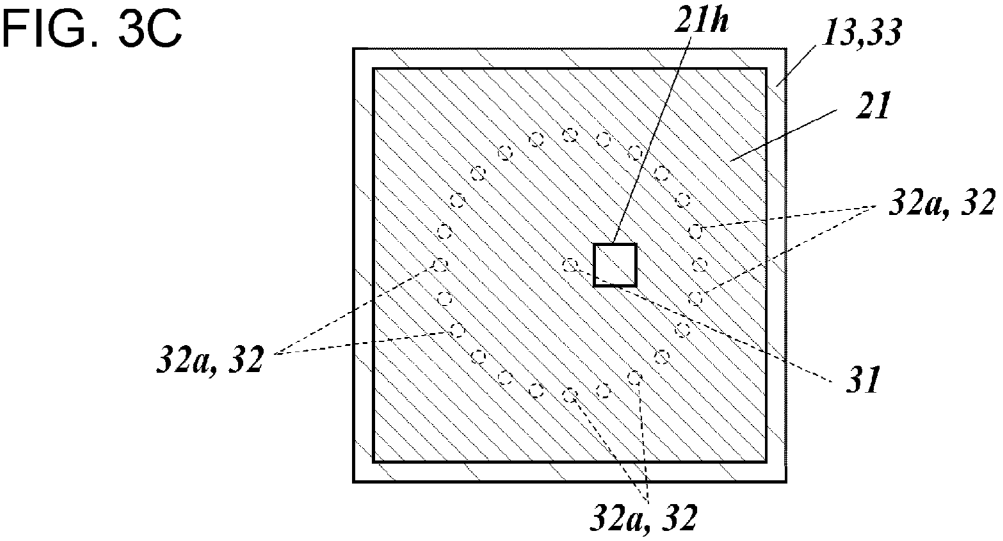
FIG. 3C is a sectional view taken along line B2-B2 of FIG. 2.
Figure 4A:
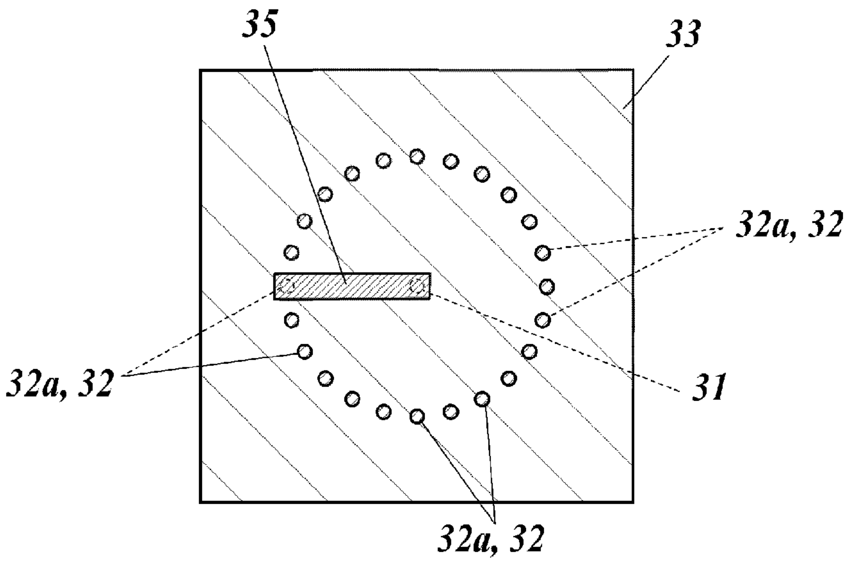
FIG. 4A is a sectional view taken along line B3-B3 of FIG. 2.
Figure 4B:
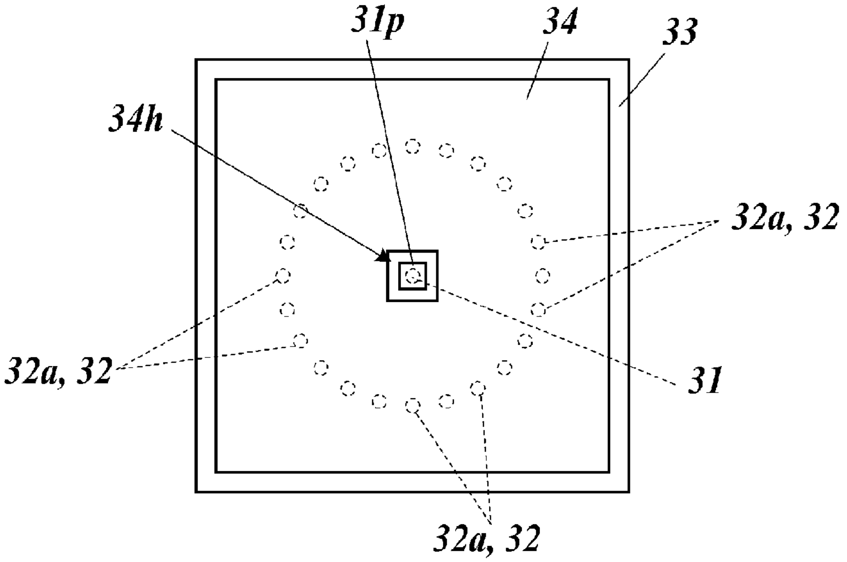
FIG. 4B is a bottom view illustrating the band-pass filter of the first embodiment.

FIG. 1 is a perspective view illustrating a band-pass filter of the first embodiment of the present disclosure. FIG. 2 is a longitudinal sectional view taken along line A-A of FIG. 1. FIG. 3A is a plan view illustrating the band-pass filter of the first embodiment. FIG. 3B is a sectional view taken along line B1-B1 of FIG. 2. FIG. 3C is a sectional view taken along line B2-B2 of FIG. 2. FIG. 4A is a sectional view taken along line B3-B3 of FIG. 2. FIG. 4B is a bottom view illustrating the band-pass filter of the first embodiment. In the following description, the axial direction of conductor pins 11 and 31 of a band-pass filter 1 will be defined as a "height direction", and a direction perpendicular to the axial direction will be defined as a "transverse direction". The height direction and the transverse direction mentioned in the specification do not need to match the height direction and the transverse direction during use.

The band-pass filter 1 of the first embodiment includes a first resonator 10 and a second resonator 30 that are electromagnetically coupled to each other. The first resonator 10 and the second resonator 30 are arranged in the height direction. The first resonator 10 and the second resonator 30 may be integrally formed. The second resonator 30 is an input resonator to which a signal that passes through a filter is input from the outside. The first resonator 10 is an output resonator that outputs a signal that has passed through the band-pass filter 1 to the outside. The first resonator 10 and the second resonator 30 are electromagnetically coupled to each other by transmitting an electromagnetic field through an opening 21*h* of a second surrounding conductor 21. The first resonator 10 and the second resonator 30 each correspond to an example of a specific resonator according to the present disclosure.

The first resonator 10 includes the conductor pin 11, a first surrounding conductor 12 that surrounds the conductor pin 11 in a radial direction, a dielectric 13 that is positioned between the conductor pin 11 and the first surrounding conductor 12, a second surrounding conductor 14, the second surrounding conductor 21, and a first intermediate conductor 15 that extends from the conductor pin 11 to the first surrounding conductor 12. The second surrounding conductors 14 and 21 surround the dielectric 13 from the upper and lower sides. The dielectric 13 occupies a region that is surrounded by the first surrounding conductor 12. The dielectric 13 may be extended to a region outside the first surrounding conductor 12. The first intermediate conductor 15 corresponds to an example of an intermediate conductor according to the present disclosure.

The conductor pin 11 extends in the height direction and has a first end portion extending to the height of the second surrounding conductor 14 and a second end portion 11*t* (FIG. 2) extending to a height that is spaced apart from the second surrounding conductor 21. The first end portion of the conductor pin 11 is positioned in an opening 14*h* of the second surrounding conductor 14, and the first end portion of the conductor pin 11 is exposed to the outside or connected to a connection pad 11*p* that is exposed through the opening 14*h*. The first end portion of the conductor pin 11 and the connection pad 11*p* are located inside the inner periphery of the opening 14*h* and are not in contact with the second surrounding conductor 14. The conductor pin 11 is connected to an external signal line through the opening 14*h* and outputs a signal that has passed through the band-pass filter 1. The conductor pin 11 may be formed by injecting a conductor into a via hole of the dielectric 13 and may be referred to as an output via.

The first surrounding conductor 12 includes a plurality of pin-shaped conductors 12*a*, and the plurality of conductors 12*a* are arranged so as to be spaced apart from one another. The plurality of conductors 12*a* may be arranged in a cylindrical arrangement, or any of various arrangements such as a rectangular arrangement and a polygonal arrangement with which the plurality of conductors 12*a* surround the conductor pin 11 in the radial direction when viewed in the height direction may be employed. In the height direction, one end of the first surrounding conductor 12 is connected to the second surrounding conductor 14 located on the upper side, and the other end of the first surrounding conductor 12 is connected to the second surrounding conductor 21 located on the lower side. The pitch of the pin-shaped conductors 12*a*, which are included in the first surrounding conductor 12, is set to a pitch at which leakage of electromagnetic waves at a resonance frequency is suppressed. The first surrounding conductor 12 may be grounded through the second surrounding conductors 14 and 21. Each of the pin-shaped conductors 12*a* may be formed by injecting a conductor into a via hole of the dielectric 13. Note that the first surrounding conductor 12 may be a tubular conductor wall that surrounds the conductor pin 11.

The second surrounding conductors 14 and 21 are each a planar or film-shaped conductor that extends two-dimensionally in the transverse direction, and in a region including the region surrounded by the first surrounding conductor 12, the dielectric 13 is sandwiched between the second surrounding conductors 14 and 21 in the vertical direction. The second surrounding conductor 14 has the opening 14*h* through which the first end of the conductor pin 11 or the connection pad 11*p* is exposed to the outside. The second surrounding conductor 21 has the opening 21*h* through which an electromagnetic field is transmitted from the second resonator 30. The second surrounding conductors 14 and 21 may be grounded and referred to as ground conductors.

The first intermediate conductor 15 is a conductor that is long in one direction and that has a linear shape or a belt-like shape and extends in the transverse direction from the second end portion 11*t* of the conductor pin 11 in the dielectric 13 so as to electrically connect the second end portion 11*t* of the conductor pin 11 and a portion (e.g., one of the pin-shaped conductors 12*a*) of the first surrounding conductor 12 to each other. When viewed from above, the first intermediate conductor 15 may have a shape extending along a straight line or may have a shape extending along a curved line. The curved line may be a meandering line or may have a corner portion. In addition, when viewed in the transverse direction, the first intermediate conductor 15 may have a shape extending in the horizontal direction or may include a portion having a shape extending obliquely as long as the first intermediate conductor 15 extends in a direction crossing the height direction.

The second resonator 30 includes the conductor pin 31, a first surrounding conductor 32 that surrounds the conductor pin 31 in the radial direction, a dielectric 33 that is positioned between the conductor pin 31 and the first surrounding conductor 32, the second surrounding conductor 21 and a second surrounding conductor 34 that surround the dielectric 33 from the upper and lower sides, and a second intermediate conductor 35 that extends from the conductor pin 31 to the first surrounding conductor 32. The second surrounding conductor 21 may be a conductor shared by the first resonator 10. The second intermediate conductor 35 corresponds to an example of the intermediate conductor according to the present disclosure.

The conductor pin 31 extends in the height direction and has a first end portion extending to the height of the second surrounding conductor 34 and a second end portion 31*t* (FIG. 2) extending to a height that is spaced apart from the second surrounding conductor 21. The first end portion of the conductor pin 31 is exposed through an opening 34*h* of the second surrounding conductor 34 or connected to a connection pad 31*p* that is exposed through the opening 34*h*. The first end portion of the conductor pin 31 and the connection pad 31*p* are located inside the inner periphery of the opening 34*h* and are not in contact with the second surrounding conductor 34. A signal that passes through the band-pass filter 1 is input to the conductor pin 31 from an external signal line through the opening 34*h*. The conductor pin 31 may be formed by injecting a conductor into a via hole of the dielectric 33 and may be referred to as an input via.

The dielectric 33 is continuous with the dielectric 13 of the first resonator 10 via the opening 21*h* and may be integrated with the dielectric 13 of the first resonator 10. The dielectric 33 occupies a region that is surrounded by the first surrounding conductor 32. The dielectric 33 may be extended to a region outside the first surrounding conductor 32.

The first surrounding conductor 32 is configured in a manner similar to the first surrounding conductor 12 of the first resonator 10 except that the first surrounding conductor 32 is positioned between the second surrounding conductors 34 and 21. The second surrounding conductors 34 and 21 are configured in a manner similar to the second surrounding conductors 14 and 21 of the first resonator 10 except that they are turned upside down.

The second intermediate conductor 35 is a conductor that is long in one direction and that has a linear shape or a belt-like shape and extends in the transverse direction from the second end portion 31*t* of the conductor pin 31 so as to electrically connect the second end portion 31*t* of the conductor pin 31 and a portion (e.g., one of pin-shaped conductors 32*a*) of the first surrounding conductor 32 to each other. When viewed from above, the second intermediate conductor 35 may have a shape extending along a straight line or may have a shape extending along a curved line. The curved line may be a meandering line or may have a corner portion. In addition, when viewed in the transverse direction, the second intermediate conductor 35 may have a shape extending in the horizontal direction or may include a portion having a shape extending obliquely. The second intermediate conductor 35 may be shaped such that the second intermediate conductor 35 and the first intermediate conductor 15 are symmetrical in shape or may have a different shape. The second intermediate conductor 35 and the first intermediate conductor 15 may be symmetrically arranged or may be asymmetrically arranged.

<Description of Operation>

The first resonator 10 resonates as a result of electromagnetic energy being confined to the dielectric 13 surrounded by the first surrounding conductor 12 and the second surrounding conductors 14 and 21. The distribution of an electromagnetic field vibrates at a vibration frequency and in a vibration mode that are determined by a boundary condition based on the arrangement of the first surrounding conductor 12 and the arrangement of the conductor pin 11 and by a capacitance component and an inductance component associated with among the conductors and the dielectric 13.

In the first resonator 10, an inductance component is generated by the conductor pin 11 and the dielectric 13, which are arranged around the conductor pin 11, and a capacitance component is generated between the conductor pin 11 and the first surrounding conductor 12. In addition, in the first resonator 10, the second end portion 11*t* of the conductor pin 11 is positioned so as to be spaced apart from the second surrounding conductor 21, and the first intermediate conductor 15 and the second surrounding conductor 21 are arranged so as to face each other, so that a capacitance component is generated between the second end portion 11*t* of the conductor pin 11 and the second surrounding conductor 21 and between the first intermediate conductor 15 and the second surrounding conductor 21. Furthermore, a current flows through the first intermediate conductor 15 from the side on which the conductor pin 11 is disposed to the side on which the first surrounding conductor 12 is disposed, and thus, an inductance component is generated in the first intermediate conductor 15.

When the first resonator 10 is reduced in size and designed with a high resonant frequency, the space between the conductor pin 11 and the first surrounding conductor 12 is reduced, and thus, the capacitance component there between increases. If only the capacitance component increases, it becomes difficult to match the first resonator 10 to a predetermined impedance. However, in the first resonator 10 of the first embodiment, since an inductance component is added to the first intermediate conductor 15, the magnitude of the inductance component that is added to the first intermediate conductor 15 can be changed by changing the path and the length of the first intermediate conductor 15. Thus, by suitably designing the first intermediate conductor 15 in accordance with the capacitance component of the first resonator 10, the inductance component can be adjusted.

In the first resonator 10, the first intermediate conductor 15 is suitably designed, and an adjusted inductance component is added to the first intermediate conductor 15, so that impedance matching of the first resonator 10 is achieved while the first resonator 10 is smaller in size and has resonance characteristics in a predetermined high-frequency band.

Similar to the first resonator 10, in the second resonator 30, an adjusted inductance component is added by suitably designing the second intermediate conductor 35, so that impedance matching of the second resonator 30 is achieved while the second resonator 30 is smaller in size and has resonance characteristics in a predetermined high-frequency band.

At the time of using the band-pass filter 1, when a signal is input to the conductor pin 31 of the second resonator 30, a frequency component that is included in the input signal and that resonates in the second resonator 30 and the first resonator 10 resonates and is transmitted from the second resonator 30 to the first resonator 10. Then, a signal of the resonated frequency component is output to the outside via the conductor pin 11 of the first resonator 10. In contrast, a frequency component that is included in the input signal and that is different from a resonant frequency is attenuated while passing through the second resonator 30 and the first resonator 10. Thus, a signal component in a resonant frequency band can be extracted through the band-pass filter 1.

The signal enters the second resonator 30 from the outside, passes through the second resonator 30 and the first resonator 10, and exits from the first resonator 10 to the outside. In addition, the impedance of the first resonator 10 and the impedance of the second resonator 30 are each suitably matched with an external signal line. Thus, when a resonant frequency signal is input from the outside to the second resonator 30, passes through the second resonator 30 and the first resonator 10 and is output from the first resonator 10 to the outside, reflection of the signal is suppressed. Therefore, a high transmittance of the band-pass filter 1 is achieved.

As described above, according to the band-pass filter 1 of the first embodiment, the first resonator 10 includes the first intermediate conductor 15 that extends from the conductor pin 11 in the transverse direction and that is connected to the first surrounding conductor 12, and the second resonator 30 includes the second intermediate conductor 35 that extends from the conductor pin 31 in the transverse direction and that is connected to the first surrounding conductor 32. In addition, by the first intermediate conductor 15 and the second intermediate conductor 35, an inductance component can be added to the first resonator 10 and the second resonator 30 in addition to a capacitance component. Furthermore, by changing the designs of the first intermediate conductor 15 and the second intermediate conductor 35, the capacitance component and the inductance component, which have been mentioned above, can be adjusted in such a manner that the degrees of their changes are different from each other. Thus, the degree of freedom when designing the impedance of the first resonator 10 and the impedance of the second resonator 30 is improved. Therefore, by suitably designing the first intermediate conductor 15 and the second intermediate conductor 35, the band-pass filter 1 that is matched with a predetermined impedance while, for example, being reduced in size and having resonance characteristics in a predetermined high-frequency band can be achieved.

In addition, according to the band-pass filter 1 of the first embodiment, the end portions of the conductor pins 11 and 31 are spaced apart from the second surrounding conductor 21. Thus, the current that flows into the conductor pins 11 and 31 flows into the first intermediate conductor 15 and the second intermediate conductor 35, and the inductance component of the first intermediate conductor 15 and the inductance component of the second intermediate conductor 35 can be further increased.

Furthermore, according to the band-pass filter 1 of the first embodiment, the second end portions 11*t* and 31*t* of the conductor pins 11 and 31 are respectively connected to the first intermediate conductor 15 and the second intermediate conductor 35. Here, a plurality of design patterns are assumed in which the first intermediate conductor 15 and the second intermediate conductor 35 are fixed at a certain height. When comparing the plurality of design patterns, the distance between each of the conductor pins 11 and 31 and the second surrounding conductor 21 becomes maximum with the configuration of the first embodiment in which the second end portions 11*t* and 31*t* of the conductor pins 11 and 31 are respectively connected to the first intermediate conductor 15 and the second intermediate conductor 35. In other words, in a design pattern in which the second end portion 11*t* of the conductor pin 11 projects toward the second surrounding conductor 21 beyond the first intermediate conductor 15 and in which the second end portion 31*t* of the conductor pin 31 projects toward the second surrounding conductor 21 beyond the second intermediate conductor 35, the distance between each of the conductor pins 11 and 31 and the second surrounding conductor 21 is shorter than that in the design pattern of the first embodiment. Where in the first embodiment, the second end portion 11*t* of the conductor pin 11 does not project toward the second surrounding conductor 21 beyond the first intermediate conductor 15 and the second end portion 31*t* of the conductor pin 31 does not project toward the second surrounding conductor 21 beyond the second intermediate conductor 35. Thus, by employing the configuration of the first embodiment, the distance between each of the second end portions 11*t* and 31*t* of the conductor pins 11 and 31 and the second surrounding conductor 21 can be increased, and the capacitance component that is generated between each of the second end portions 11*t* and 31*t* of the conductor pins 11 and 31 and the second surrounding conductor 21 can be reduced. Therefore, the ratio of the inductance component to the overall capacitance component of the first resonator 10 or the second resonator 30 can be improved. In addition, according to the configuration in which the second end portions 11*t* and 31*t* of the conductor pins 11 and 31 are respectively connected to the first intermediate conductor 15 and the second intermediate conductor 35, since the second end portion 11*t* of the conductor pin 11 and the first intermediate conductor 15 are located at the same height, and the second end portion 31*t* of the conductor pin 31 and the second intermediate conductor 35 are located at the same height, when the band-pass filter 1 is manufactured by stacking the conductors of layers on top of one another, simplification of the manufacturing process can be achieved. More specifically, a step of providing a through conductor that enables the conductor pin 11 to project from the bottom surface of the first intermediate conductor 15 and a through conductor that enables the conductor pin 31 to project from the top surface of the second intermediate conductor 35 can be omitted. Furthermore, according to the configuration in which the second end portions 11*t* and 31*t* of the conductor pins 11 and 31 are respectively connected to the first intermediate conductor 15 and the second intermediate conductor 35, the capacitance component between the second surrounding conductor 21 and the conductor pins 11 and 31 is determined by the area of the first intermediate conductor 15 and the area of the second intermediate conductor 35, and it is not necessary to adjust the capacitance component between the second end portions 11*t* and 31*t* of the conductor pins 11 and 31 separately, so that the design for adjusting a resonant frequency and an impedance can be made easily.

In addition, according to the band-pass filter 1 of the first embodiment, since the first resonator 10 and the second resonator 30 are stacked one on top of the other in the height direction, a reduction of the surface area of the band-pass filter 1 when viewed in the height direction can be achieved. Furthermore, since the first resonator 10 and the second resonator 30 are stacked one on top of the other in the height direction, a signal can be input to the second resonator 30 from one side in the height direction, and a signal can be output from the other side in the height direction. Therefore, in a communication device in which an antenna element, the band-pass filter 1, and a circuit board that processes a frequency-extracted signal are stacked on top of one another in this order, simplification and shortening of a signal line between the antenna element and the band-pass filter 1 and a signal line between the band-pass filter 1 and the circuit board can be achieved.

Second Embodiment

Figure 5:
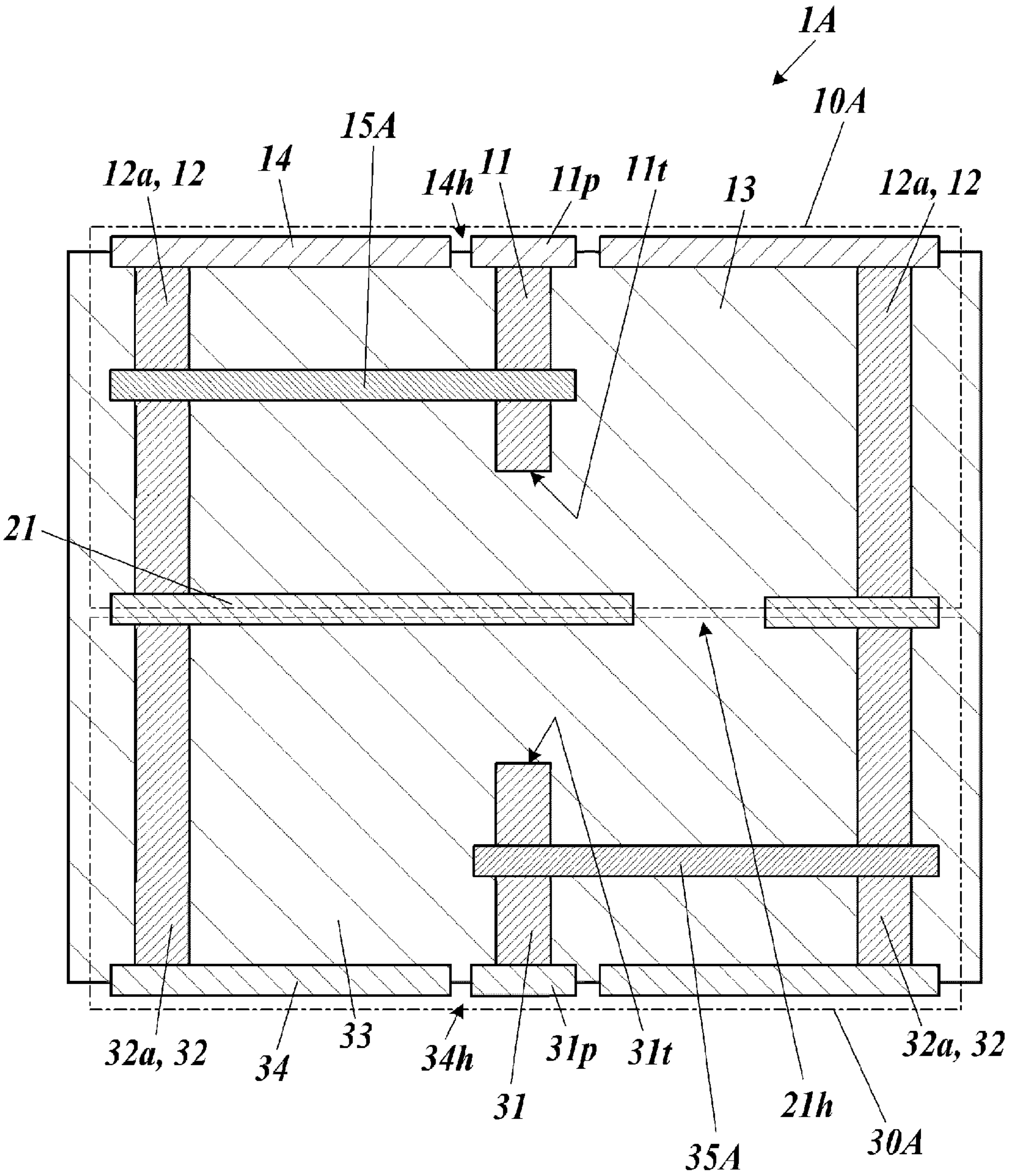
FIG. 5 is a longitudinal sectional view illustrating a band-pass filter of a second embodiment of the present disclosure.

FIG. 5 is a longitudinal sectional view illustrating a band-pass filter according to the second embodiment of the present disclosure. The configuration of a band-pass filter 1A of the second embodiment is similar to that of the band-pass filter 1 of the first embodiment, except with regard to the arrangement of a first intermediate conductor 15A and a second intermediate conductor 35A. The first intermediate conductor 15A and the second intermediate conductor 35A each correspond to an example of the intermediate conductor according to the present disclosure.

The first intermediate conductor 15A extends in the transverse direction so as to connect an intermediate portion of the conductor pin 11 in the height direction and the pin-shaped conductors 12*a* of the first surrounding conductor 12 to each other. Similarly, the second intermediate conductor 35A extends in the transverse direction so as to connect an intermediate portion of the conductor pin 31 in the height direction and the pin-shaped conductors 32*a* of the first surrounding conductor 32 to each other.

According to the band-pass filter 1A of the second embodiment, in a first resonator 10A, the length of the conductor pin 11 and the arrangement of the first intermediate conductor 15A in the height direction can be design parameters that are independent of each other. Thus, a design change can be made to the capacitance component between the second end portion 11*t* of the conductor pin 11 and the second surrounding conductor 21 by changing the length of the conductor pin 11, and design changes can be made to the capacitance component and the inductance component that are added to the first intermediate conductor 15A by changing the arrangement of the first intermediate conductor 15A. Therefore, with the above-described configuration, the degree of freedom when designing the overall capacitance component and the overall inductance component of the first resonator 10A is further improved, and a reduction in size, desired frequency characteristics, and impedance matching can be further easily achieved. The same degree of freedom applies to a second resonator 30A, and as a result, a reduction in the size of the band-pass filter 1A, desired frequency characteristics, and impedance matching can be further easily achieved.

Third Embodiment

Figure 6:
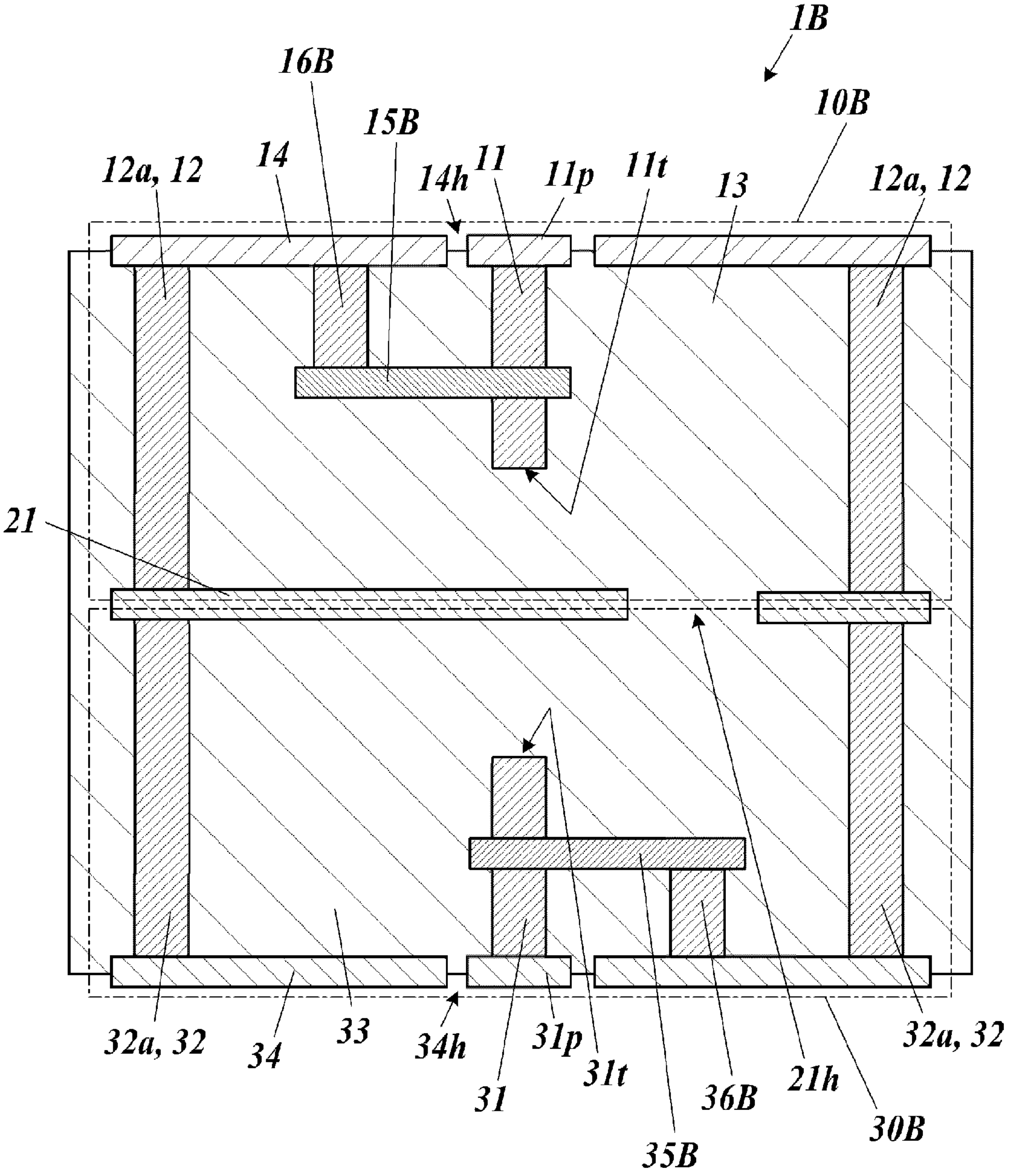
FIG. 6 is a longitudinal sectional view illustrating a band-pass filter of a third embodiment of the present disclosure.

FIG. 6 is a longitudinal sectional view illustrating a band-pass filter according to the third embodiment of the present disclosure. The configuration of a band-pass filter 1B of the third embodiment is similar to that of the band-pass filter 1 of the first embodiment or the band-pass filter 1A of the second embodiment except that the band-pass filter 1B further includes connection pins 16B and 36B and that a first intermediate conductor 15B and a second intermediate conductor 35B are connected to different members. The first intermediate conductor 15B and the second intermediate conductor 35B each correspond to an example of the intermediate conductor according to the present disclosure.

In a first resonator 10B, one end of the first intermediate conductor 15B is connected to the conductor pin 11, and the other end of the first intermediate conductor 15B is connected to the second surrounding conductor 14 via the connection pin 16B. In other words, the other end of the first intermediate conductor 15B is spaced apart from the first surrounding conductor 12. The connection pin 16B is a pin-shaped conductor extending in the height direction and is positioned so as to be spaced apart from the conductor pin 11 in the transverse direction. The connection pin 16B may be configured such that one end portion thereof is located at the same height as the first intermediate conductor 15B.

In a second resonator 30B, one end of the second intermediate conductor 35B is connected to the conductor pin 31, and the other end of the second intermediate conductor 35B is connected to the second surrounding conductor 34 via the connection pin 36B. In other words, the other end of the second intermediate conductor 35B is spaced apart from the first surrounding conductor 32. The connection pin 36B is a pin-shaped conductor extending in the height direction and is positioned so as to be spaced apart from the conductor pin 31 in the transverse direction. The connection pin 36B may be configured such that one end portion thereof is located at the same height as the second intermediate conductor 35B.

The connection pins 16B and 36B may be formed by injecting a conductor into via holes of the dielectrics 13 and 33 and may each be referred to as a connection via.

Note that, in FIG. 6, although the first intermediate conductor 15B is connected to an intermediate portion of the conductor pin 11 in a length direction, the first intermediate conductor 15B may be connected to the second end portion 11*t* of the conductor pin 11. In addition, although the connection pin 16B is connected to the second surrounding conductor 14 located on the upper side in FIG. 6, the connection pin 16B may be connected to the second surrounding conductor 21 located on the lower side and may be spaced apart from the second surrounding conductor 14 located on the upper side. The same applies to the second intermediate conductor 35B and the connection pin 36B of the second resonator 30B.

According to the band-pass filter 1B of the third embodiment, the degree of freedom when designing the terminal position of the first intermediate conductor 15B and the terminal position of the second intermediate conductor 35B can be improved, and for example, the first intermediate conductor 15B and the second intermediate conductor 35B can be shorter than those in each of the configurations of the first and second embodiments. Also in the case of employing a configuration in which the first intermediate conductor 15B is connected to the second surrounding conductor 14 via the connection pin 16B and in which the second intermediate conductor 35B is connected to the second surrounding conductor 34 via the connection pin 36B, an inductance component is added to the first intermediate conductor 15B and the terminal position of the second intermediate conductor 35B, and this can contribute to impedance matching.

Fourth Embodiment

Figure 7A:
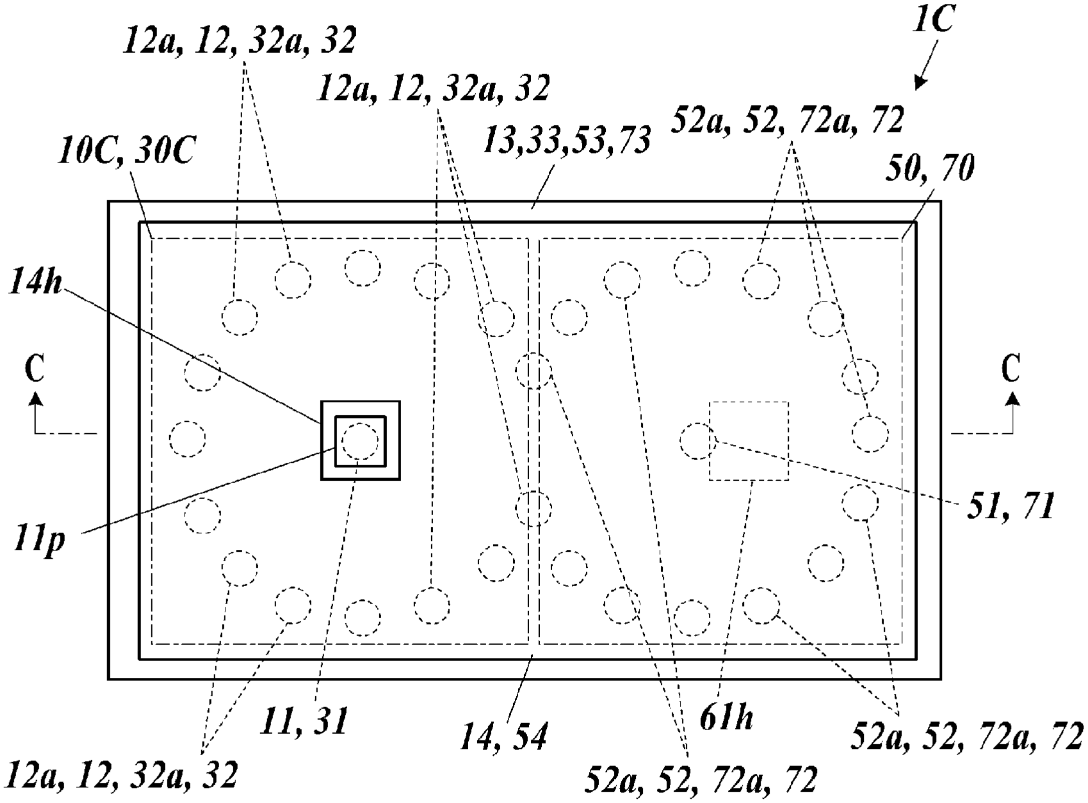
FIG. 7A is a plan view illustrating a band-pass filter of a fourth embodiment of the present disclosure.
Figure 7B:
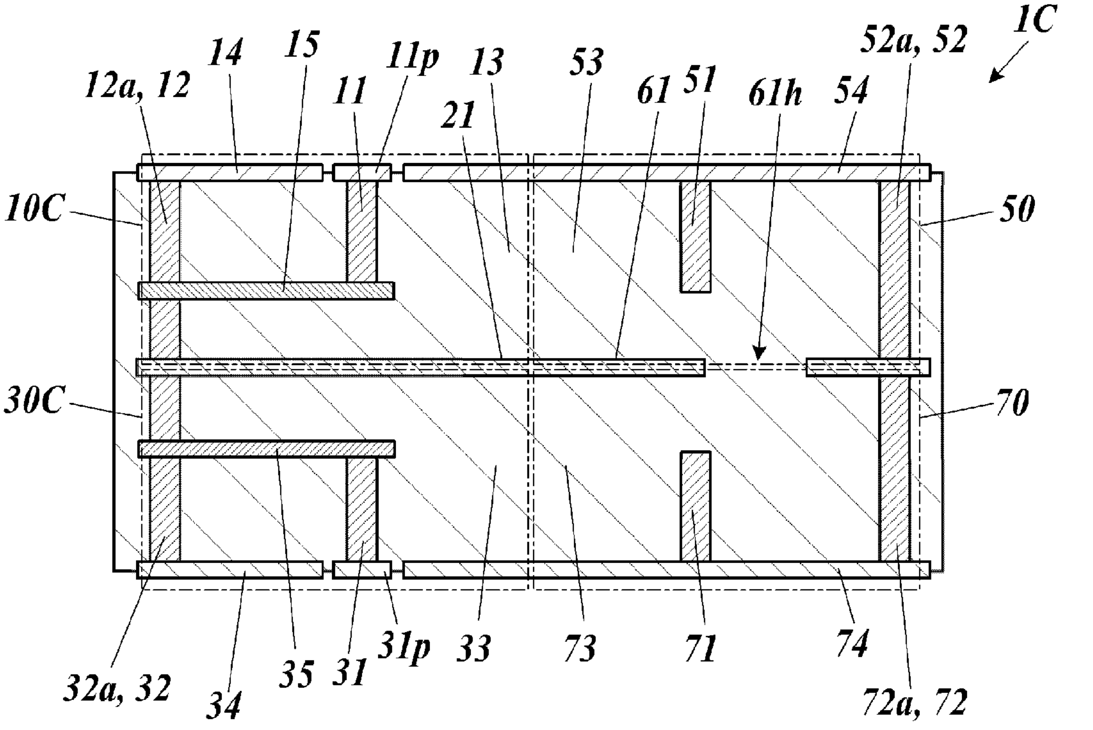
FIG. 7B is a longitudinal sectional view taken along line C-C of FIG. 7A.

FIG. 7A is a plan view illustrating a band-pass filter of the fourth embodiment of the present disclosure. FIG. 7B is a longitudinal sectional view taken along line C-C of FIG. 7A.

A band-pass filter 1C of the fourth embodiment includes four resonators 10C, 30C, 50, and 70 that are electromagnetically coupled to one another. The two resonators 30C and 70 that are adjacent to each other in the transverse direction are electromagnetically coupled by connecting the dielectric 33 and a dielectric 73 to each other, and the two resonators 70 and 50 that are adjacent to each other in the vertical direction are electromagnetically coupled by connecting the dielectric 73 and a dielectric 53 to each other through an opening 61*h* of a second surrounding conductor 61 (FIG. 7B). The other two resonators 50 and 10C that are adjacent to each other in the transverse direction are electromagnetically coupled by connecting the dielectric 53 and the dielectric 13 to each other. The electromagnetic coupling of the resonators 30C and 70, which are adjacent to each other in the transverse direction, may be achieved by causing a region that is surrounded by the first surrounding conductor 32 and a region that is surrounded by a first surrounding conductor 72 to partially overlap each other and by spacing at least one of the pin-shaped conductors 32*a* and at least one of pin-shaped conductors 72*a* that are arranged in the overlapping region apart from each other by a distance that allows an electromagnetic field at a resonant frequency to pass therethrough. This is common to the electromagnetic coupling of the resonators 50 and 10C. In the band-pass filter 1C, the resonators 10C and 30C correspond to an example of a "first pair of resonators that are arranged in the axial direction" and "specific resonators" according to the present disclosure, and the resonators 50 and 70 correspond to an example of a "second pair of resonators that are arranged in the axial direction" and "non-specific resonators" according to the present disclosure.

The resonators 10C and 30C are similar to the first resonator 10 and the second resonator 30 of the first embodiment except with regard to the following: the second surrounding conductor 21 (FIG. 7B) that is positioned between the resonators 10C and 30C does not have an opening, a portion of the pin-shaped conductors 12*a* of the first surrounding conductor 12 include a portion that is opened by the above-mentioned distance, and a portion of the pin-shaped conductors 32*a* of the first surrounding conductor 32 include a portion that is opened by the above-mentioned distance.

The resonator 50 includes a conductor pin 51, a first surrounding conductor 52 that surrounds the conductor pin 51 in the radial direction, the dielectric 53 that occupies a region between the conductor pin 51 and the first surrounding conductor 52, a second surrounding conductor 54, and the second surrounding conductor 61. The second surrounding conductors 54 and 61 surround the dielectric 53 from the upper and lower sides.

The resonator 70 includes a conductor pin 71, the first surrounding conductor 72 that surrounds the conductor pin 71 in the radial direction, the dielectric 73 that occupies a region between the conductor pin 71 and the first surrounding conductor 72, a second surrounding conductor 74 (FIG. 7B), and the second surrounding conductor 61. The second surrounding conductors 74 and 61 surround the dielectric 73 from the upper and lower sides.

In the plurality of resonators 10C, 30C, 50, and 70, the dielectrics 53, 73, 13, and 33 may be integrally formed so as to be continuous with one another. The second surrounding conductors 14 and 54 that are adjacent to each other in the transverse direction and that are located at the same height may be an integrally formed conductor. This is common to the other second surrounding conductors 21 and 61 that are adjacent to each other in the transverse direction and the other second surrounding conductors 34 and 74 (FIG. 7B) that are adjacent to each other in the transverse direction.

The conductor pins 51 and 71 extend in the height direction. One end of the conductor pin 51 is connected to the second surrounding conductor 54, and one end of the conductor pin 71 is connected to the second surrounding conductor 74. The other ends of the conductor pins 51 and 71 are spaced apart from the second surrounding conductor 61. Note that the conductor pin 51 may be connected to both the second surrounding conductor 54 on the upper side and the second surrounding conductor 61 on the lower side. Alternatively, the conductor pin 51 may be spaced apart from the second surrounding conductor 54 on the upper side and may be connected to the second surrounding conductor 61 on the lower side. The conductor pin 71 may be connected to both the second surrounding conductor 61 on the upper side and the second surrounding conductor 74 on the lower side. Alternatively, the conductor pin 71 may be connected to the second surrounding conductor 61 on the upper side and may be spaced apart from the second surrounding conductor 74 on the lower side.

The first surrounding conductors 52/52*a* and 72/72*a* have configurations similar to those of the first surrounding conductors 12 and 32 of the first embodiment except that, in a portion in which the resonator 10C and 30C face each other, the pitch of first surrounding conductors 52*a* and the pitch of first surrounding conductors 72*a* are each wider than that of the other portions. The second surrounding conductors 54 and 74 have configurations similar to those of the second surrounding conductors 14 and 34 of the first embodiment except that the second surrounding conductors 54 and 74 do not have either the opening 14*h* or the opening 34*h* and that the one end of the conductor pin 51 and the one end of the conductor pin 71 are respectively connected to the second surrounding conductor 54 and the second surrounding conductor 74. The second surrounding conductor 61 has a configuration similar to that of the second surrounding conductor 21 of the first embodiment.

In the band-pass filter 1C of the fourth embodiment, the resonator 30C corresponds to an input resonator to which a signal is input, and the resonator 10C corresponds to an output resonator that outputs a signal. The pair of resonators 30C and 10C to or from which a signal is input or output include the first intermediate conductor 15 (FIG. 7B) and the second intermediate conductor 35 (FIG. 7B) and may be arranged in the height direction. A signal passes though the pair of resonators 50 and 70. The pair of resonators 50 and 70 do not include intermediate conductors that extend from the conductor pins 51 and 71 in the transverse direction and the pair of resonators 50 and 70 may be arranged in the height direction. The area when the resonators 10C and 30C are viewed in the height direction (the area of a region that is surrounded by the first surrounding conductors 12 and 32) and the area when the resonators 50 and 70 are viewed in the height direction (the area of a region that is surrounded by the first surrounding conductors 52 and 72) may be different from each other.

In the band-pass filter 1C of the fourth embodiment, a signal in a resonant frequency band among the signals input to the resonator 30C through a signal line is transmitted to each of the resonators 30C, 70, 50, and 10C while resonating and is output by the resonator 10C on the output side to which the signal line is connected. In contrast, a signal outside the resonant frequency band is attenuated by each of the resonators 30C, 70, 50, and 10C. Thus, a signal component in the resonant frequency band can be extracted through the band-pass filter 1C. Note that the second surrounding conductor 21 between the resonators 10C and 30C may have an opening, and in this case, a signal that is input to the resonator 30C partially and directly propagates from the resonator 30C to the resonator 10C and is output to the outside.

According to the band-pass filter 1C of the fourth embodiment, by suitably setting the frequencies of resonance peaks of the plurality of resonators 30C, 70, 50, and 10C to be different values, for example, while a signal pass band is widened to a predetermined width, a desired filter characteristic such as a characteristic that the transmittance sharply drops at a boundary of the pass band can be easily achieved.

In addition, according to the band-pass filter 1C of the fourth embodiment, by employing a configuration in which the resonators 10C and 30C, which respectively correspond to the output resonator and the input resonator, include the first intermediate conductor 15 and the second intermediate conductor 35, impedance matching with signal input and output lines can be achieved, and the filter characteristics can be improved.

Furthermore, according to the band-pass filter 1C of the fourth embodiment, the resonator 10C including the first intermediate conductor 15 and the resonator 30C including the second intermediate conductor 35 are arranged in the height direction, and the resonators 50 and 70 that do not include intermediate conductors that extend from the conductor pins 51 and 71 in the transverse direction are arranged in the height direction. Such arrangements can reduce the surface area of the band-pass filter 1C when viewed in the height direction compared with a configuration in which all of the four resonators are arranged in the transverse direction. In addition, the resonator 10C, which is the input resonator, and the resonator 30C, which is the output resonator, are arranged one above the other, and thus, when a communication device is formed by stacking an antenna element, the band-pass filter 1C, and a circuit board that processes a frequency-extracted signal on top of one another, simplification and shortening of signal lines between them can be achieved.

<Simulation Results>

Figure 8A:
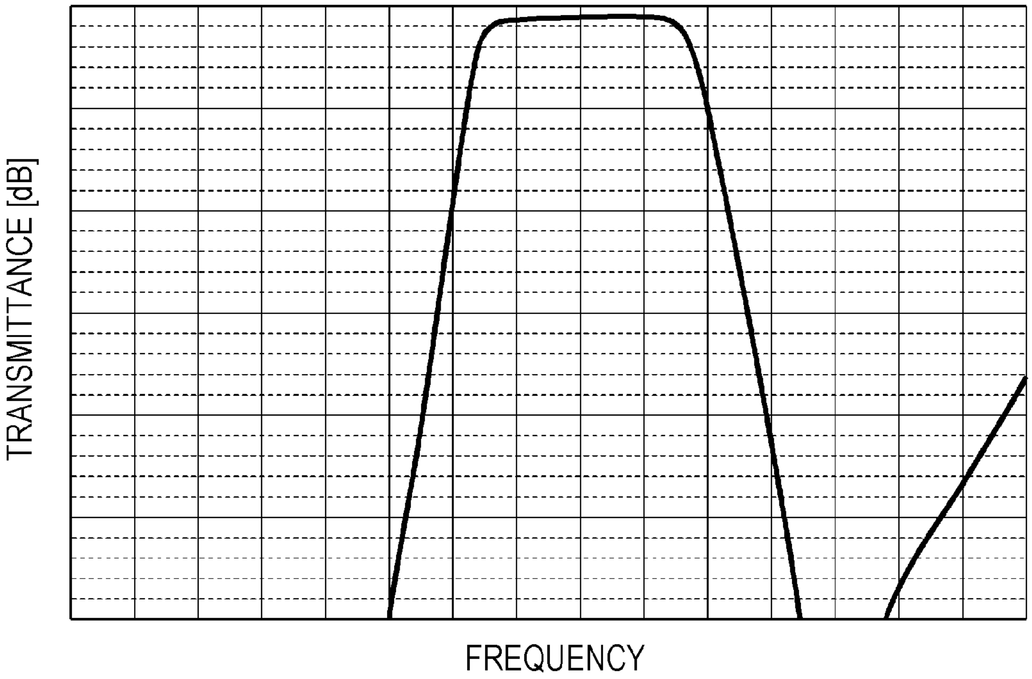
FIG. 8A is a graph illustrating filter characteristics of the band-pass filter of the fourth embodiment.
Figure 8B:
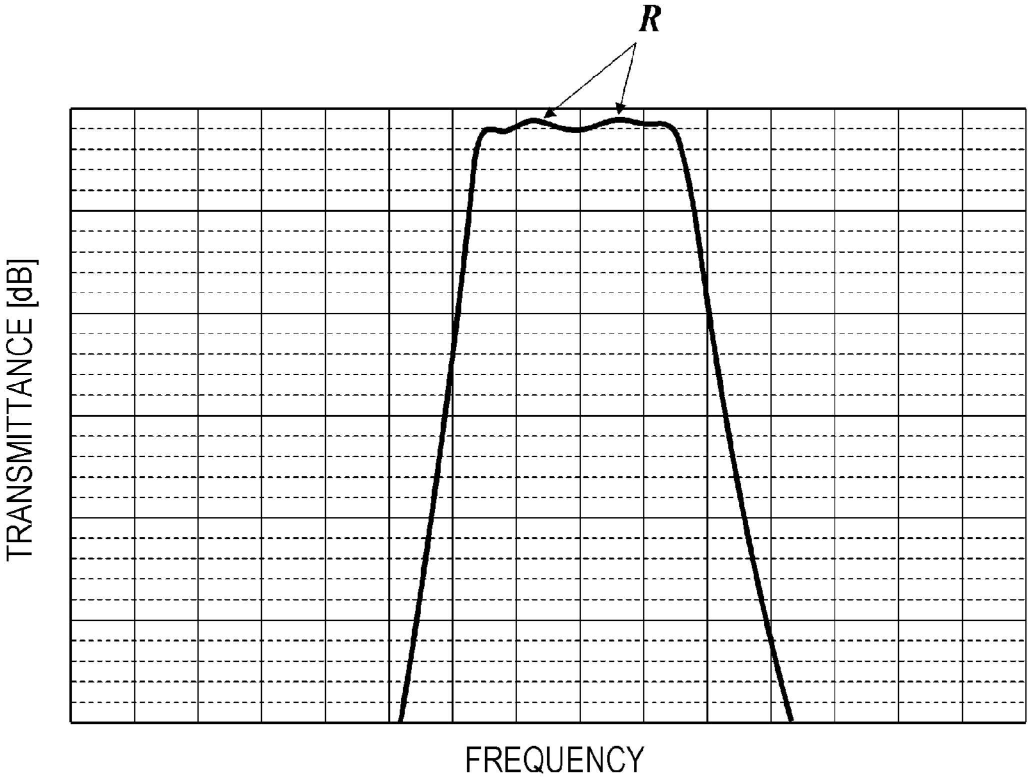
FIG. 8B is a graph illustrating filter characteristics of a comparative example.

FIG. 8A is a graph illustrating filter characteristics of the band-pass filter of the fourth embodiment. FIG. 8B is a comparative example to FIG. 8A and is a graph illustrating filter characteristics of a different band-pass filter than that of the fourth embodiment. A band-pass filter of the comparative example has the same size as the resonators 10C, 30C, 50, and 70 of the fourth embodiment and employs a structure that does not include the first intermediate conductor 15 and the second intermediate conductor 35. In addition, the band-pass filter of the comparative example has a configuration in which design parameters (the length of the conductor pins 11, 31, 51, and 71) are optimized so as to be closest to a desired frequency characteristic and a desired impedance. In the simulations, calculations were performed by assuming each of the first surrounding conductors 12, 32, 52, 72 as a cylindrical wall body for simplification.

As illustrated in FIG. 8A, in the band-pass filter 1C of the fourth embodiment, a uniform transmittance in dB was obtained in a pass frequency band. In contrast, as illustrated in FIG. 8B, in the band-pass filter of the comparative example, a ripple R was generated in the transmittance in dB over the pass frequency band. The ripple R is generated due to an impedance mismatch in the band-pass filter of the comparative example.

It is understood from the simulation results that, in the case where a pass frequency is set in a desired high-frequency band by reducing the size of a band-pass filter, impedance matching cannot be achieved with the structure of the comparative example, whereas by employing the structure of the embodiment, impedance matching is achieved, and favorable filter characteristics can be obtained.

(First Modification)

Figure 9:
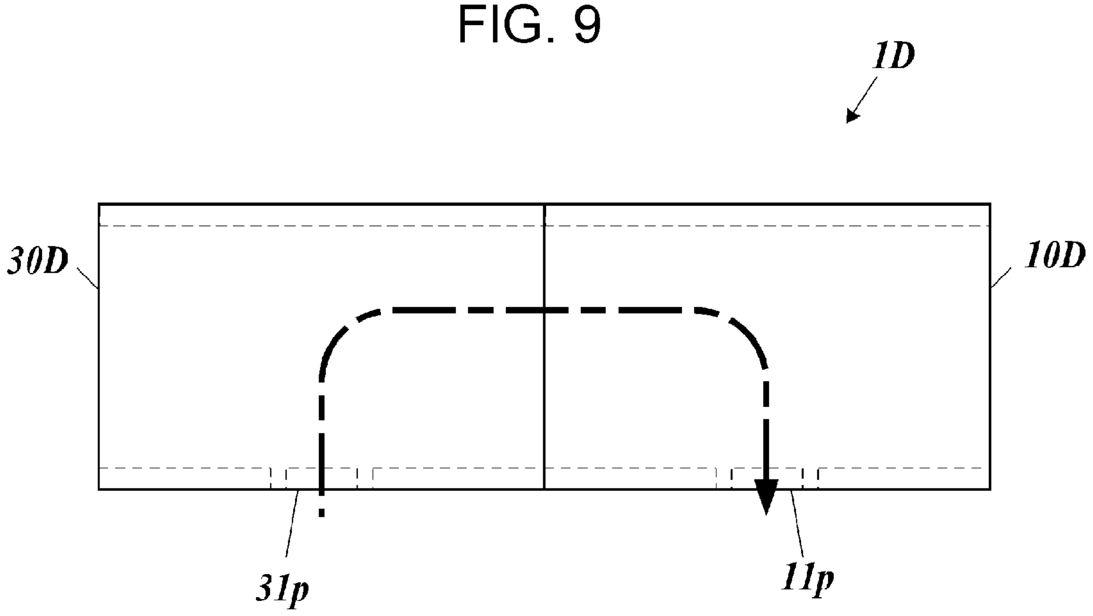
FIG. 9 is a schematic diagram illustrating a band-pass filter of a first modification.

FIG. 9 is a schematic diagram illustrating a band-pass filter of the first modification. In FIG. 9, the order in which a signal propagates resonators is indicated by a one-dot chain line.

In the above-described first to fourth embodiments, the configurations have been described in each of which one of the first resonators 10, 10A, and 10B each of which outputs a signal and a corresponding one of the second resonators 30, 30A, and 30B to each of which a signal is input are arranged in the vertical direction (the axial direction of the conductor pins). However, like a band-pass filter 1D of the first modification, a configuration in which a first resonator 10D that outputs a signal and a second resonator 30D to which a signal is input are arranged in the transverse direction (a direction crossing the axial direction) may be employed. The first resonator 10D illustrated in FIG. 9 has a configuration similar to that of each of the first resonators 10, 10A, and 10B illustrated in FIG. 1 to FIG. 6, and the second resonator 30D illustrated in FIG. 9 has a configuration similar to that of each of the second resonator 30, 30A, and 30B illustrated in FIG. 1 to FIG. 6. However, the opening 21*h* of the second surrounding conductor 21 if FIG. 2 is not provided herein, and the space between portions of each first surrounding conductor is increased as in the resonators 10C and 50 that are arranged in the transverse direction in FIG. 7, so that electromagnetic coupling to the first resonator 10D and the second resonator 30D is achieved through the space.

In the band-pass filter 1D of the first modification, a signal input unit (the connection pad 31*p* or an end portion of the conductor pin 31) and a signal output unit (the connection pad 11*p* or an end portion of the conductor pin 11) are arranged on the same side (the lower surface side of the band-pass filter 1D).

According to the band-pass filter 1D of the first modification, a reduction in the height of a device can be achieved by the arrangement of the first resonator 10D and the second resonator 30D. In addition, since the signal input unit and the signal output unit are arranged on the same side, a surface mount device can be obtained.

Note that the first resonator 10D illustrated in FIG. 9 may be disposed upside down, and the signal output unit may be positioned on a surface that is opposite to the surface on which the signal input unit is positioned. With such a configuration, a configuration in which a signal is input in one direction and output in the one direction, and a configuration in which the input unit and the output unit are displaced from each other in the transverse direction can be achieved.

(Second Modification)

Figure 10:
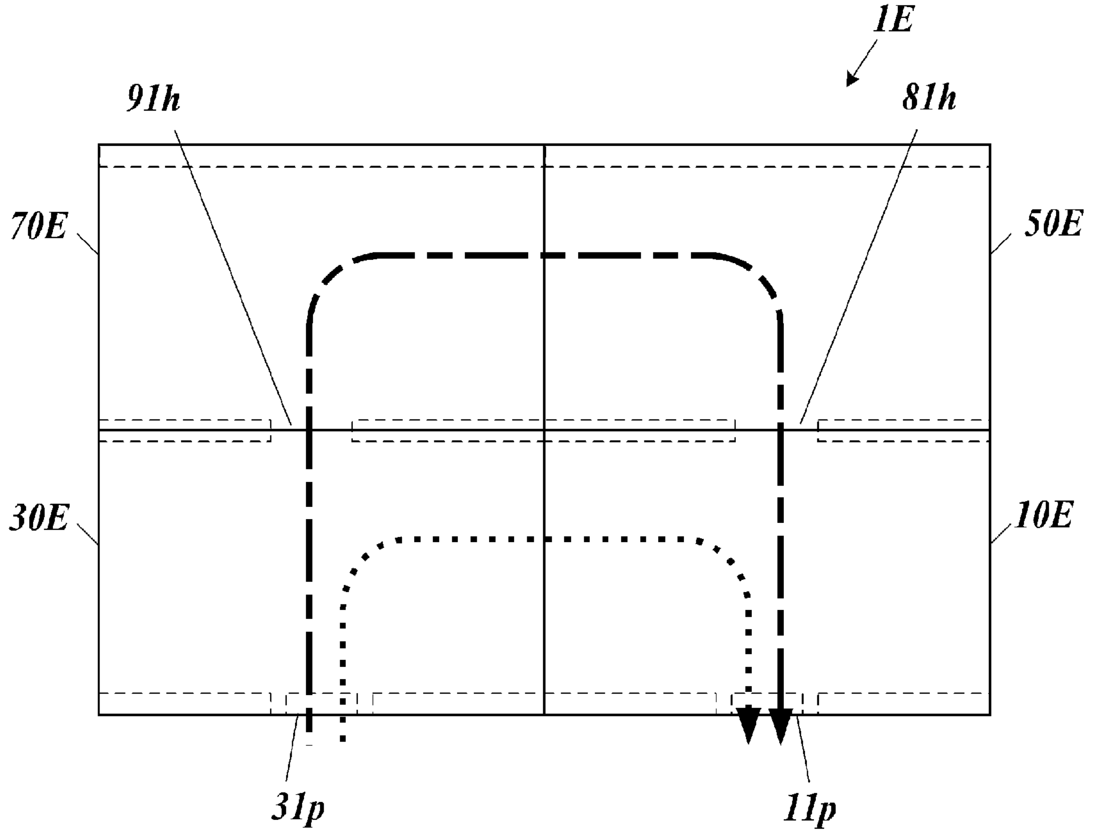
FIG. 10 is a schematic diagram illustrating a band-pass filter of a second modification.

FIG. 10 is a schematic diagram illustrating a band-pass filter of a second modification. In FIG. 10, the order in which a signal propagates resonators is indicated by a one-dot chain line.

A band-pass filter 1E of the second modification includes four resonators 10E, 30E, 50E, and 70E that are electromagnetically coupled to one another. A signal is input to the resonator 30E, and the resonator 10E outputs a signal. The resonators 50E and 70E allow a signal to propagate in the band-pass filter 1E. The resonators 10E, 30E, 50E, and 70E are configured in a manner similar to the resonators 10C, 30C, 50, and 70 of the fourth embodiment. However, the configurations of the resonators 10E, 30E, 50E, and 70E for being electromagnetically coupled to adjacent resonators thereof are different from those of the resonators 10C, 30C, 50, and 70 (see FIGS. 7A and 7B) of the fourth embodiment.

The resonator 30E to which a signal is input and the resonator 10E that outputs a signal are arranged in the transverse direction (a direction crossing the axial direction of conductor pins). The two resonators 50E and 70E that propagate a signal in the band-pass filter 1E are arranged in the transverse direction (the direction crossing the axial direction of the conductor pins). In addition, the resonators 10E and 50E are arranged in the vertical direction (the axial direction of the conductor pins), and the resonators 30E and 70E are arranged in the vertical direction (the axial direction of the conductor pins). A signal input unit (the connection pad 31*p* (see FIGS. 7A and 7B) or an end portion of the conductor pin 31 (see FIGS. 7A and 7B)) and a signal output unit (the connection pad 11*p* (see FIGS. 7A and 7B) or an end portion of the conductor pin 11 (see FIGS. 7A and 7B)) are arranged on the same side (the lower surface side of the band-pass filter 1E).

A dielectric of the resonator 30E and a dielectric of the resonator 70E are connected to each other through an opening 91*h* that is positioned between the two resonators 30E and 70E, which are arranged one above the other, so that a signal propagates from the resonator 30E to the resonator 70E. A dielectric of the resonator 50E and a dielectric of the resonator 10E are connected to each other through an opening 81*h* that is positioned between the two resonators 50E and 10E, which are another pair of resonators, so that a signal propagates from the resonator 50E to the resonator 10E. In the two resonators 50E and 70E, which are arranged in the transverse direction, the space between portions of each first surrounding conductor is set to be large as in the resonators 10C and 50 (see FIGS. 7A and 7B) illustrated in FIG. 7 such that a signal propagates through the space. Similarly, in the two resonators 10E and 30E, which are arranged in the transverse direction and to and from which a signal is input and output, the space between portions of each first surrounding conductor may be set to be large such that a signal propagates through the space. In this case, a signal propagates along a propagation path that is indicated by a dashed line in addition to a propagation path that is indicated by a one-dot chain line.

In the band-pass filter 1E, the resonators 10E and 30E correspond to an example of a "first pair of resonators that are arranged a direction crossing the axis direction" and "specific resonators" according to the present disclosure, and the resonators 50E and 70E correspond to an example of a "second pair of resonators that are arranged a direction crossing the axis direction" and "non-specific resonators" according to the present disclosure.

According to the band-pass filter 1E of the second modification, by causing a signal to propagate to three or more resonators, for example, while a signal pass band is widened to a predetermined width, a desired filter characteristic such as a characteristic that the transmittance sharply drops at a boundary of the pass band can be easily achieved. The above-arrangement of the four resonators 10E, 30E, 50E, and 70E can reduce the surface area of the band-pass filter 1E when viewed in the height direction compared with the configuration in which all the four resonators are arranged in the transverse direction. In addition, since the signal input unit and the signal output unit are arranged on the same side, a surface mount device can be obtained.

The embodiments of the present disclosure have been described above. However, the present invention is not limited to the above-described embodiments. For example, in the first to fourth embodiments and the first and second modifications, the case has been described in which the resonator on the upper side and the resonator on the lower side or the two resonators arranged in the transverse direction have a symmetrical configuration. However, the band-pass filter of the present disclosure may be configured by combining one of the first resonators 10 (see FIG. 2), 10A (see FIG. 5), and 10B (see FIG. 6) of the first to third embodiments and one of the second resonators 30 (see FIG. 2), 30A (see FIG. 5), and 30B (see FIG. 6) of the first to third embodiments, the one first resonator and the one second resonator having different configurations. In addition, the band-pass filter of the present disclosure may be configured by combining a resonator that includes the first intermediate conductors 15 (see FIG. 2), 15A (see FIG. 5), and 15B (see FIG. 6) or the second intermediate conductors 35 (see FIG. 2), 35A (see FIG. 5), and 35B (see FIG. 6) of the first to third embodiments and a resonator that does not include these intermediate conductors. Furthermore, in the case where the band-pass filter of the present disclosure is configured by combining three or more resonators, as long as a structure is employed in which at least one of the input resonator or the output resonator includes an intermediate conductor that transversely extends from a conductor pin and that is connected to the first surrounding conductor or the second surrounding conductor, any other resonators such as different types of resonators may be used as the other resonators. Other details described in the embodiments can be suitably changed within the scope of the invention.

INDUSTRIAL APPLICABILITY

The present disclosure is applicable to a band-pass filter.

REFERENCE SIGNS LIST

1, 1A to 1E band-pass filter
10, 10A, 10B, 10D first resonator (specific resonator)
30, 30A, 30B, 30D second resonator (specific resonator)
11, 31 conductor pin
11*t*, 31*t* second end portion
12, 32 first surrounding conductor
13, 33 dielectric
14, 21, 34 second surrounding conductor
14*h*, 21*h*, 34*h* opening
15, 15A, 15B first intermediate conductor
16B connection pin
35, 35A, 35B second intermediate conductor
36B connection pin
10C, 30C, 10E, 30E resonator (specific resonator)
50, 70, 50E, 70E resonator (non-specific resonator)
51, 71 conductor pin
52, 72 first surrounding conductor
53, 73 dielectric
54, 61, 74 second surrounding conductor
61*h*, 81*h*, 91*h* opening

The invention claimed is:

1. A band-pass filter comprising:
a plurality of resonators that are electromagnetically coupled to each other,
wherein at least one of the plurality of resonators is a specific resonator to which an input signal is input from outside of the band-pass filter or that outputs an output signal to the outside,
wherein the specific resonator includes
a conductor pin,
a first surrounding conductor that surrounds the conductor pin in a radial direction,
a dielectric that is positioned between the conductor pin and the first surrounding conductor,
a second surrounding conductor that surrounds the dielectric in an axial direction of the conductor pin,
an intermediate conductor that extends in a direction crossing the axial direction of the conductor pin and electrically connects the conductor pin to the first surrounding conductor or the second surrounding conductor,
a connection pin that extends in the axial direction of the conductor pin at a position spaced apart from the conductor pin, and includes a first end and a second end, and
the first end is connected to the intermediate conductor and the second end is connected to the second surrounding conductor.

2. The band-pass filter according to claim 1,
wherein the conductor pin has one end portion that is spaced apart from the second surrounding conductor.

3. The band-pass filter according to claim 2,
wherein the intermediate conductor is connected to the one end portion of the conductor pin.

4. The band-pass filter according to claim 1,
wherein the intermediate conductor is connected to an intermediate portion of the conductor pin in the axial direction of the conductor pin.

5. The band-pass filter according to claim 1,
wherein the plurality of resonators include a first pair of resonators that are arranged in a direction crossing the axial direction and a second pair of resonators that are arranged in a direction crossing the axial direction,
wherein the first pair of resonators and the second pair of resonators are arranged in the axial direction,
wherein the first pair of resonators are both the specific resonators, and
wherein the second pair of resonators are both non-specific resonators, each of the non-specific resonators includes a respective second conductor pin, a third surrounding conductor that surrounds the respective second conductor pin in the radial direction, a respective second dielectric that is positioned between the respective second conductor pin and the third surrounding conductor, and a fourth surrounding conductor that surrounds the respective second dielectric in an axial direction of the respective second conductor pin and each of the non-specific resonators does not include an intermediate conductor.

6. The band-pass filter according to claim 5,
wherein one resonator of the first pair of resonators and an other resonator of the first pair of resonators are respectively an input resonator to which the input signal is input from the outside and an output resonator that outputs the output signal to the outside, and
wherein the fourth surrounding conductor that is positioned between the second dielectric of the one resonator of the first pair of resonators and the second dielectric of the one resonator of the second pair of resonators, the one resonator of the first pair of resonators and the one resonator of the second pair of resonators being arranged in the axial direction, has an opening, and
wherein the fourth surrounding conductor that is positioned between the second dielectric of the other resonator of the first pair of resonators and the second dielectric of the other resonator of the second pair of resonators, the other resonator of the first pair of resonators and the other resonator of the second pair of resonators being arranged in the axial direction, has an opening.

7. A band-pass filter comprising:

a plurality of resonators that are electromagnetically coupled to each other, wherein the plurality of resonators include a first pair of resonators that are arranged in an axial direction of a conductor pin and a second pair of resonators that are arranged in the axial direction, wherein the first pair of resonators and the second pair of resonators are arranged in a direction crossing the axial direction, wherein the first pair of resonators are both specific resonators to which an input signal is input from outside of the band-pass filter or that outputs an output signal to the outside, wherein each of the specific resonators include the conductor pin, a first surrounding conductor that surrounds the conductor pin in a radial direction, a dielectric that is positioned between the conductor pin and the first surrounding conductor, a second surrounding conductor that surrounds the dielectric in the axial direction, and an intermediate conductor that extends in a direction crossing the axial direction and that electrically connects the conductor pin to the first surrounding conductor or the second surrounding conductor, and wherein the second pair of resonators are both non-specific resonators, each of the non-specific resonators includes a respective second conductor pin, a third surrounding conductor that surrounds the respective second conductor pin in the radial direction, a respective second dielectric that is positioned between the respective second conductor pin and the third surrounding conductor, and a fourth surrounding conductor that surrounds the respective second dielectric in an axial direction of the second conductor pin and each of the non-specific resonators does not include an intermediate conductor.

8. The band-pass filter according to claim 7, wherein the conductor pin has one end portion that is spaced apart from the second surrounding conductor.

9. The band-pass filter according to claim 8, wherein the intermediate conductor is connected to the one end portion of the conductor pin.

10. The band-pass filter according to claim 7, wherein the intermediate conductor is connected to an intermediate portion of the conductor pin in the axial direction of the conductor pin.

11. The band-pass filter according to claim 7, wherein one resonator of the first pair of resonators and an other resonator of the first pair of resonators are respectively an input resonator to which the input signal is input from the outside and an output resonator that outputs the output signal to the outside, and wherein the fourth surrounding conductor that is positioned between the second dielectric of one resonator of the second pair of resonators and the second dielectric of an other resonator of the second pair of resonators has an opening.

12. The band-pass filter according to claim 7, wherein the respective second conductor pins of the non-specific resonators each have one end portion that is spaced apart from the fourth surrounding conductor.

13. A band-pass filter comprising:

a plurality of resonators that are electromagnetically coupled to each other, wherein two of the plurality of resonators are each specific resonators to which an input signal is input from outside of the band-pass filter or that outputs an output signal to the outside, wherein each of the specific resonators include a conductor pin, a first surrounding conductor that surrounds the conductor pin in a radial direction, a dielectric that is positioned between the conductor pin and the first surrounding conductor, a second surrounding conductor that surrounds the dielectric in an axial direction of the conductor pin, and an intermediate conductor that extends in a direction crossing the axial direction and that electrically connects the conductor pin to the first surrounding conductor or the second surrounding conductor, and wherein each of the specific resonators are arranged in the axial direction.

14. The band-pass filter according to claim 13, wherein the intermediate conductor is connected to an intermediate portion of the conductor pin in the axial direction of the conductor pin.

15. The band-pass filter according to claim 13, wherein the plurality of resonators include a first pair of resonators that are arranged in the axial direction and a second pair of resonators that are arranged in the axial direction, wherein the first pair of resonators and the second pair of resonators are arranged in a direction crossing the axial direction, wherein the first pair of resonators are both the specific resonators, and wherein the second pair of resonators are both non-specific resonators, each of the non-specific resonators includes a respective second conductor pin, a third surrounding conductor that surrounds the respective second conductor pin in the radial direction, a respective second dielectric that is positioned between the respective second conductor pin and the third surrounding conductor, and a fourth surrounding conductor that surrounds the respective second dielectric in an axial direction of the respective second conductor pin and each of the non-specific resonators does not include an intermediate conductor.

16. The band-pass filter according to claim 15, wherein one resonator of the first pair of resonators and an other resonator of the first pair of resonators are respectively an input resonator to which the input signal is input from the outside and an output resonator that outputs the output signal to the outside, and wherein the fourth surrounding conductor that is positioned between the second dielectric of one resonator of the second pair of resonators and the second dielectric of an other resonator of the second pair of resonators has an opening.

17. The band-pass filter according to claim 13, wherein the conductor pin has one end portion that is spaced apart from the second surrounding conductor.

18. The band-pass filter according to claim 17, wherein the intermediate conductor is connected to the one end portion of the conductor pin.

* * * * *